(12) United States Patent
Iwatani

(10) Patent No.: US 9,435,278 B2
(45) Date of Patent: Sep. 6, 2016

(54) CONTROL SYSTEM FOR INTERNAL COMBUSTION ENGINE

(71) Applicant: Kazuki Iwatani, Susono (JP)

(72) Inventor: Kazuki Iwatani, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/426,174

(22) PCT Filed: Sep. 3, 2013

(86) PCT No.: PCT/JP2013/073685
§ 371 (c)(1),
(2) Date: Mar. 5, 2015

(87) PCT Pub. No.: WO2014/038550
PCT Pub. Date: Mar. 13, 2014

(65) Prior Publication Data
US 2015/0226145 A1 Aug. 13, 2015

(30) Foreign Application Priority Data

Sep. 7, 2012 (JP) .................................. 2012-197174

(51) Int. Cl.
*F01N 3/20* (2006.01)
*F02D 41/02* (2006.01)
(Continued)

(52) U.S. Cl.
CPC ........... *F02D 41/0245* (2013.01); *F01N 3/021* (2013.01); *F01N 3/023* (2013.01);
(Continued)

(58) Field of Classification Search
CPC .... F01N 3/021; F01N 3/0814; F01N 3/2066; F01N 2430/06; F01N 2560/06; F01N 2900/08; F01N 2900/1404; F01N 2900/1602; F01N 2900/1606; F01N 2900/1626; F02D 41/0245; F02D 41/0255; F02D 41/045; F02D 41/1466; F02D 41/40; F02D 2041/0022; F02D 2200/0802; F02D 2200/0812; F02D 2200/602
USPC ................... 60/285, 286, 297, 301, 311, 320
See application file for complete search history.

(56) References Cited

U.S. PATENT DOCUMENTS

2005/0223698 A1* 10/2005 Murata ................. F01N 3/0814
60/286

FOREIGN PATENT DOCUMENTS

| JP | 10-61429 | 3/1998 |
|---|---|---|
| JP | 2003-307145 | 10/2003 |

(Continued)

*Primary Examiner* — Jorge Leon, Jr.
(74) *Attorney, Agent, or Firm* — Finnegan, Henderson, Farabow, Garrett & Dunner, LLP

(57) ABSTRACT

The present invention pertains to a control system for an internal combustion engine equipped with an exhaust gas purification apparatus including an $NO_x$ catalyst having an ability of reducing $NO_x$ and a particulate filter, and its object is to prevent deterioration in the acceleration performance while preventing an increase in exhaust emissions when the temperature of the $NO_x$ catalyst is low. The control system for an internal combustion engine according to the present invention includes an exhaust gas purification apparatus provided in an exhaust passage of the internal combustion engine and including an $NO_x$ catalyst having an ability of reducing $NO_x$ and a particulate filter, intake air quantity restriction means for restricting the intake air quantity in relation to the temperature of the $NO_x$ catalyst, fuel restriction means for restricting the fuel injection quantity in relation to the intake air quantity of the internal combustion engine, and trapped PM amount obtaining means for obtaining the amount of PM trapped in the particulate filter. When the amount of PM trapped in the particulate filter is not larger than a predetermined amount and the internal combustion engine is in an accelerating operation state, the control system corrects a restriction value of the fuel injection quantity in relation to the intake air quantity of the internal combustion engine and the temperature of the $NO_x$ catalyst.

1 Claim, 5 Drawing Sheets

(51) Int. Cl.
  *F01N 3/023* (2006.01)
  *F02D 41/40* (2006.01)
  *F01N 3/035* (2006.01)
  *F01N 3/021* (2006.01)
  *F02D 41/18* (2006.01)
  *F02D 41/04* (2006.01)
  *F01N 3/08* (2006.01)
  *F02D 41/00* (2006.01)
  *F02D 41/14* (2006.01)

(52) U.S. Cl.
  CPC ........... *F01N 3/035* (2013.01); *F01N 3/206* (2013.01); *F01N 3/2033* (2013.01); *F01N 3/2066* (2013.01); *F02D 41/0002* (2013.01); *F02D 41/025* (2013.01); *F02D 41/182* (2013.01); *F02D 41/40* (2013.01); *F01N 3/0814* (2013.01); *F01N 2330/30* (2013.01); *F01N 2330/34* (2013.01); *F01N 2430/06* (2013.01); *F01N 2560/06* (2013.01); *F01N 2900/08* (2013.01); *F01N 2900/1404* (2013.01); *F01N 2900/1602* (2013.01); *F01N 2900/1606* (2013.01); *F01N 2900/1626* (2013.01); *F02D 41/029* (2013.01); *F02D 41/0255* (2013.01); *F02D 41/0275* (2013.01); *F02D 41/045* (2013.01); *F02D 41/1466* (2013.01); *F02D 2041/001* (2013.01); *F02D 2041/0022* (2013.01); *F02D 2200/0802* (2013.01); *F02D 2200/0812* (2013.01); *Y02T 10/24* (2013.01); *Y02T 10/26* (2013.01); *Y02T 10/42* (2013.01); *Y02T 10/44* (2013.01)

(56) References Cited

FOREIGN PATENT DOCUMENTS

| | | |
|---|---|---|
| JP | 2005-307907 | 11/2005 |
| JP | 2007-321614 | 12/2007 |
| JP | 2012-7557 | 1/2012 |
| WO | WO 2007/138454 A1 | 12/2007 |

* cited by examiner

CONTROL SYSTEM FOR INTERNAL COMBUSTION ENGINE

CROSS-REFERENCE TO RELATED APPLICATIONS

This application is a national phase application of International Application No. PCT/JP2013/073685, filed Sep. 3, 2013, and claims the priority of Japanese Application No. 2012-197174, filed Sep. 7, 2012, the content of both of which is incorporated herein by reference.

TECHNICAL FIELD

The present invention relates to a control system for an internal combustion engine equipped with an exhaust gas purification apparatus including an $NO_x$ catalyst having an ability of reducing $NO_x$ and a particulate filter arranged in an exhaust passage, and more particularly to a technology of controlling the fuel injection quantity in the internal combustion engine.

BACKGROUND ART

In a known art, when the temperature of a catalyst is lower than a purification temperature window of the catalyst and the internal combustion engine is operating in an accelerating state, if the exhaust gas temperature is higher than the catalyst temperature, the degree of opening of a throttle valve is decreased and the degree of opening of an EGR valve is decreased, to thereby raise the temperature of the catalyst quickly (see, for example, patent literature 1).

In another known art, in a system adapted to decrease the intake air quantity and retard the fuel injection time when the temperature of a selective catalytic reduction catalyst is lower than a purification temperature window, the lower the temperature of the selective catalytic reduction catalyst is, the more the intake air quantity is decreased (see, for example, patent literature 2).

In another known art, in an exhaust gas purification apparatus for an internal combustion engine adapted to perform fuel addition control for supplying unburned fuel component to a catalyst provided in the exhaust system of the internal combustion engine, when the intake air quantity is larger than a predetermined quantity set as a function of the temperature of the catalyst, the quantity of the unburned fuel component to be supplied is decreased (see, for example, patent document 3).

In another known art, in a system adapted to restrict the fuel injection quantity to an upper limit value when a base fuel injection quantity determined based on the load of the internal combustion engine is larger than the upper limit value, the upper limit value is set smaller when the amount of PM trapped in a particulate filter is large than when it is small (see, for example, patent literature 4).

In another known art, in an exhaust gas purification apparatus having an oxidation catalyst provided in the exhaust system of an internal combustion engine, the fuel injection quantity is restricted so that the temperature of the oxidation catalyst does not exceed the upper bound of an allowable temperature range (see, for example, patent literature 5).

CITATION LIST

Patent Literature

Patent Literature 1: Japanese Patent Application Laid-Open No, H10-061429

Patent Literature 2: Japanese Patent Application Laid-Open No. 2012-007557

Patent Literature 3: Japanese Patent Application Laid-Open No. 2007-321614

Patent Literature 4: Japanese Patent Application Laid-Open No. 2003-307145

Patent Literature 5: Japanese Patent Application Laid-Open No. 2005-307907

SUMMARY OF THE INVENTION

Problems to be Solved by the Invention

In a process of decreasing the intake air quantity when the temperature of an NOx catalyst having an ability of reducing NOx such as a selective catalytic reduction catalyst or storage reduction catalyst is lower than a purification temperature window, if the fuel injection quantity is also decreased (or restricted) in order to prevent an increase in the quantity of particulate matter (PM) generated, the quantity of heat contained in a unit quantity of exhaust gas decreases. Consequently, it can be difficult to raise the temperature of the NOx catalyst quickly. Moreover, if the internal combustion engine is operated in an accelerating state while the intake air quantity and the fuel injection quantity are restricted, there is a possibility that the torque generated by the internal combustion engine may fall short of the required torque, leading to deterioration in the acceleration performance of the vehicle.

The present invention has been made in view of the above-described circumstances, and its object is to provide a technology that enables quick rising of the temperature of an $NO_x$ catalyst having an ability of reducing $NO_x$ while preventing or reducing the increase in exhaust emissions and deterioration in the acceleration performance when the temperature of the $NO_x$ catalyst is low in an internal combustion engine equipped with an exhaust gas purification catalyst including the $NO_x$ catalyst and a particulate filter provided in an exhaust passage.

Means for Solving the Problems

To solve the above-described problem, a control system for an internal combustion engine according to the present invention includes an exhaust gas purification apparatus provided in an exhaust passage of the internal combustion engine and including an $NO_x$ catalyst having an ability of reducing $NO_x$ and a particulate filter, intake air quantity restriction means for restricting the intake air quantity in relation to the temperature of the $NO_x$ catalyst when the temperature of the $NO_x$ catalyst is lower than a purification temperature window, fuel restriction means for restricting the fuel injection quantity in relation to the intake air quantity of the internal combustion engine, and trapped PM amount obtaining means for obtaining the amount of PM trapped in the particulate filter, and when the amount of PM trapped in the particulate filter is not larger than a predetermined amount and the internal combustion engine is in an accelerating operation state, the control system corrects a restriction value of the fuel injection quantity in relation to the intake air quantity of the internal combustion engine and the temperature of the $NO_x$ catalyst.

More specifically, the control system for an internal combustion engine according to the present invention comprises:

an exhaust gas purification apparatus arranged in an exhaust passage of the internal combustion engine and including an $NO_x$ catalyst having an ability of reducing $NO_x$ and a particulate filter;

temperature obtaining means for obtaining the temperature of said $NO_x$ catalyst;

intake air quantity restriction means that restricts the intake air quantity of the internal combustion engine in such a way as to make it smaller when the temperature obtained by said temperature obtaining means is low than when the temperature obtained by said temperature obtaining means is high;

fuel restriction means for restricting a fuel injection quantity in relation to the intake air quantity of the internal combustion engine;

trapped PM amount obtaining means for obtaining a trapped PM amount, which is defined to be the amount of particulate matter trapped in said particulate filter; and correction means that corrects a restriction value of the fuel injection quantity, when the trapped PM amount obtained by said trapped PM amount obtaining means is not larger than a predetermined amount and the internal combustion engine is in an accelerating operation state, in such a way that the restriction by said fuel restriction means is more relaxed when the temperature obtained by said temperature obtaining means is low and the intake air quantity restricted by said intake air quantity restriction means is large than when the temperature obtained by said temperature obtaining means is high and/or the intake air quantity restricted by said intake air quantity restriction means is small.

The "purification temperature window" mentioned above is a temperature range in which the $NO_x$ reducing function of the $NO_x$ catalyst is active. Since the purification temperature window changes depending on the amount of the supported catalyst and the volume of the catalyst etc., it is preferred that a purification temperature window adapted to these conditions be determined in advance by an experiment.

When the temperature of the $NO_x$ catalyst is lower than the purification temperature window, it is necessary to increase the fuel injection quantity, thereby increasing the quantity of heat contained in a unit quantity of exhaust gas to raise the temperature of the $NO_x$ catalyst quickly. However, if the fuel injection quantity is increased regardless of the intake air quantity of the internal combustion engine, although the quantity of heat contained in a unit quantity of exhaust gas increases, there is a possibility that the amount of particulate matter (PM) contained in the exhaust gas may increase. In particular, if the fuel injection quantity is increased impudently while the intake air quantity of the internal combustion engine is restricted by the intake air quantity restriction means, there is a possibility that the amount of PM contained in the exhaust gas may become excessively large. A possible countermeasure to this is to restrict the fuel injection quantity in relation to the intake air quantity to thereby make the amount of PM emitted from the internal combustion engine small, when the intake air quantity is restricted.

However, if the fuel injection quantity is restricted in relation to the intake air quantity when the intake air quantity is restricted, the quantity of heat contained in a unit quantity of exhaust gas becomes small. Then, it can be difficult to raise the temperature of the $NO_x$ catalyst quickly. Moreover, if the internal combustion engine is operated in an accelerating state while the fuel injection quantity is restricted, there is a possibility that the torque generated by the internal combustion engine may fall short of the torque required by the driver, leading to deterioration in the acceleration performance.

In view of the above, the system according to the present invention is adapted to correct a restriction value of the fuel injection quantity, when the amount of PM trapped in the particulate filter is not larger than a predetermined amount and the internal combustion engine is in an accelerating operation state, in such a way that the restriction of the fuel injection quantity is more relaxed (namely, the fuel injection amount is made larger) when the temperature of the NOx catalyst is low and the intake air quantity restricted by the intake air quantity restriction means is large than when the temperature of the NOx catalyst is high and/or the intake air quantity restricted by the intake air quantity restriction means is small. This can decrease the difference between the torque generated by the internal combustion engine and the required torque while preventing or reducing the decrease in the quantity of heat contained in a unit quantity of exhaust gas. Consequently, the temperature of the NOx catalyst can be raised quickly, and the deterioration of the acceleration performance can be reduced.

There is a possibility that the amount of PM produced by the combustion of fuel (or the amount of PM emitted from the internal combustion engine) may become larger when the restriction of the fuel injection quantity is relaxed than when it is not relaxed. However, since the fuel injection quantity after restriction is made smaller when the intake air quantity of the internal combustion engine is small than when it is large, the increase in the amount of PM produced is kept small. Moreover, since the PM emitted from the internal combustion engine is trapped by the particulate filter, the amount of PM emitted to the atmosphere barely increases.

Therefore, the control system for an internal combustion engine according to the present invention can raise the temperature of the $NO_x$ catalyst quickly while preventing an increase in exhaust emissions (or an increase in the amount of PM emitted to the atmosphere) and deterioration in the acceleration performance, when the temperature of the $NO_x$ catalyst is lower than the purification temperature window.

If the above-described correction of the restriction value of the fuel injection quantity is performed when the amount of PM trapped in the particulate filter (the trapped PM amount) is large, there is a possibility that the trapped PM amount may become excessively large, leading to an increase in the back pressure acting on the internal combustion engine.

In view of this, the correction of the restriction value according to the present invention is performed on condition that the amount of PM trapped in the particulate filter is not larger than a predetermined amount. The "predetermined amount" is determined to be equal to the largest amount of PM trapped in the particulate filter that is not considered to lead to an excessively high back pressure acting on the internal combustion engine even if the above-described correction is performed, or equal to that amount of trapped PM minus a margin. The predetermined amount is determined in advance by an experiment.

If the correction of the restriction value of the fuel injection quantity is performed on condition that the amount of PM trapped in the particulate filter is not larger than the predetermined amount, it is possible to achieve both reduction of exhaust emissions and satisfactory acceleration performance while preventing the back pressure acting on the internal combustion engine from increasing excessively.

The processing of correcting the restriction value of the fuel injection quantity may be performed when the internal combustion engine is not in an accelerating operation state. In this case, it is possible to prevent or reduce deterioration in the drivability during the accelerating operation and to prevent or reduce the increase in the fuel consumption in the operation state other than the accelerating operation while.

In the exhaust gas purification apparatus according to the present invention, the $NO_x$ catalyst may be arranged downstream of the particulate filter. Alternatively, the particulate filter may be arranged downstream of the $NO_x$ catalyst. Alternatively, the particulate filter and the $NO_x$ catalyst may be integrated (in such a way that the $NO_x$ catalyst is supported on the particulate filter). The $NO_x$ catalyst used in the present invention may be a selective catalytic reduction catalyst or a storage reduction catalyst.

Advantageous Effect of the Invention

The present invention enables quick rising of the temperature of an $NO_x$ catalyst having an ability of reducing $NO_x$ while preventing or reducing the increase in exhaust emissions and deterioration in the acceleration performance when the temperature of the $NO_x$ catalyst is low in an internal combustion engine equipped with an exhaust gas purification catalyst including the $NO_x$ catalyst and a particulate filter provided in an exhaust passage.

EMBODIMENT FOR CARRYING OUT THE INVENTION

In the following, a specific embodiment of the present invention will be described with reference to the drawings. The dimensions, materials, shapes, relative arrangements, and other features of the components that will be described in connection with the embodiment are not intended to limit the technical scope of the present invention only to them, unless particularly stated.

Figure 1:
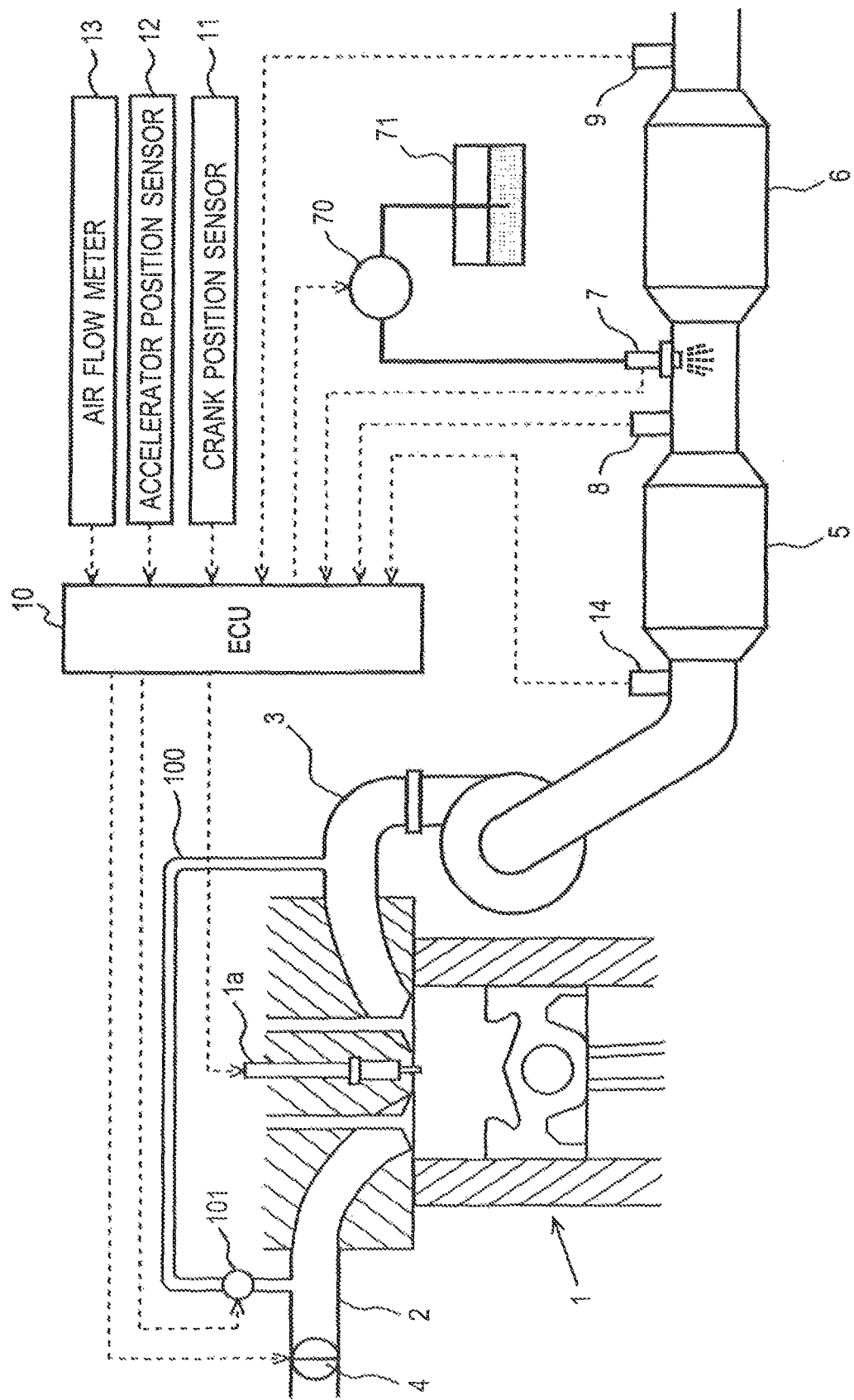
FIG. 1 is a diagram showing the general configuration of an internal combustion engine to which the present invention is applied and its air-intake and exhaust systems.

FIG. 1 is a diagram showing the general configuration of an internal combustion engine to which the present invention is applied and its air-intake and exhaust systems. The internal combustion engine 1 shown in FIG. 1 is a compression-ignition internal combustion engine (diesel engine) having a plurality of cylinders. Internal combustion engines to which the present invention is applied are not limited to compression-ignition internal combustion engines, but they may be spark-ignition internal combustion engines (gasoline engines) run in a lean burn condition.

The internal combustion engine 1 has a fuel injection valve 1a that injects fuel into the cylinder. The internal combustion engine 1 is connected with an intake passage 2 and an exhaust passage 3. The intake passage 2 is a passage for introducing fresh air (air) taken in from the atmosphere to the cylinders of the internal combustion engine 1. The exhaust passage 3 is a passage through which burned gas (or exhaust gas) discharged from the cylinders of the internal combustion engine 1 flows.

An intake throttle valve 4 is provided in the middle of the intake passage 2. The throttle valve 4 is a valve unit that adjusts the quantity of air taken into the cylinders of the internal combustion engine 1 by varying the channel cross sectional area of the intake passage 2. The throttle valve 4 has a valve body and an electric motor that drives the valve body to open/close it. The electric motor is controlled by an ECU 10 that will be described later.

In the middle of the exhaust passage 3, there are provided a first catalyst casing 5 and a second catalyst casing 6 arranged in series in order from the upstream. The first catalyst casing 5 is a cylindrical casing, which houses an oxidation catalyst and a particulate filter. In this way, the oxidation catalyst may be supported either on a catalyst carrier provided upstream of the particulate filter or on the particulate filter.

The second catalyst casing 6 is a cylindrical casing, which houses a catalyst carrier on which an $NO_x$ catalyst is supported. The $NO_x$ catalyst may be either a selective catalytic reduction catalyst or a storage reduction catalyst. In this embodiment, a case where a selective catalytic reduction catalyst (SCR) is used will be described. The catalyst carrier for the SCR catalyst may be, for example, a monolithic base member made of a heat resisting steel such as cordierite or Fe—Cr—Al alloy having a honeycomb structure in its lateral cross section that is coated with an alumina-based or zeolite-based activation component (carrier). The catalyst carrier supports a precious metal catalyst (e.g. platinum Pt or palladium Pd) having an oxidizing ability.

A catalyst carrier supporting an oxidation catalyst may also be provided downstream of the SCR catalyst in the second catalyst casing 6. When this is the case, the oxidation catalyst is used to oxidize reducing agent supplied to the SCR catalyst by a reducing agent addition valve 7 that will be described later and slipping through the SCR catalyst.

The reducing agent addition valve 7 used to add (or inject) a reducing agent, which is $NH_3$ or a precursor of $NH_3$, is attached to the exhaust passage 3 between the first catalyst casing 5 and the second catalyst casing 6. The reducing agent addition valve 7 is a valve device having an injection hole that is opened/closed by the shift of a needle. The reducing agent addition valve 7 is connected to a reducing agent tank 71 via a pump 70. The pump 70 sucks the reducing agent stored in the reducing agent tank 71 and pumps the reducing agent sucked to the reducing agent addition valve 7. The reducing agent addition valve 7 injects the reducing agent pumped from the pump 70 into the exhaust passage 3.

The reducing agent stored in the reducing agent tank 71 may be aqueous solution of urea or ammonium carbamate, or $NH_3$ gas. In this embodiment, a case in which aqueous urea solution is used as reducing agent will be described.

As aqueous urea solution is injected through the reducing agent addition valve 7, the aqueous urea solution flows into the second catalyst casing 6 with the exhaust gas. Then, the aqueous urea solution receives heat from the exhaust gas and the second catalyst casing 6, so that it is decomposed by heat or hydrolyzed. Heat decomposition or hydrolysis of aqueous urea solution produces ammonia ($NH_3$). The ammonia ($NH_3$) thus produced is adsorbed (or stored) by the SCR catalyst. The ammonia ($NH_3$) adsorbed in the SCR catalyst reacts with nitrogen oxides ($NO_x$) contained in the exhaust gas to generate nitrogen ($N_2$) and water ($H_2O$). Thus, ammonia ($NH_3$) acts as a reducing agent for the nitrogen oxides ($NO_x$).

The internal combustion engine 1 is also equipped with an EGR apparatus including an EGR passage 100 that connects the intake passage 2 and the exhaust passage 3 and an EGR valve 101 that varies the channel cross sectional area of the EGR passage 100. The EGR passage 100 is a passage allowing a portion of the exhaust gas flowing in the exhaust passage 3 to flow into the intake passage 2 downstream of the throttle valve 4 as EGR gas. The EGR valve 101 is a valve unit that adjusts the quantity of EGR gas supplied from the exhaust passage 3 to the intake passage 2 by varying the channel cross sectional area of the aforementioned EGR passage 100. The EGR valve 101 has a valve body and an electric motor that drives the valve body to open/close it. This electric motor is controlled by the ECU 10 that will be described later.

The internal combustion engine 1 having the above-described structure is equipped with the ECU 10. The ECU 10 is an electronic control unit including a CPU, a ROM, a RAM, and a backup RAM etc. The ECU 10 is electrically connected with various sensors such as a first exhaust gas temperature sensor 8, a second exhaust gas temperature sensor 9, a crank position sensor 11, an accelerator position sensor 12, an air flow meter 13, and an A/F sensor 14.

The first exhaust gas temperature sensor 8 is provided in the exhaust passage 3 downstream of the first catalyst casing 5 and upstream of the second catalyst casing 6 and outputs an electrical signal correlating with the temperature of the exhaust gas flowing out of the first catalyst casing 5, namely correlating with the temperature of the particular filter housed in the first catalyst casing 5. The second exhaust gas temperature sensor 9 is provided in the exhaust passage 3 downstream of the second catalyst casing 6 and outputs an electrical signal correlating with the temperature of the exhaust gas flowing out of the second catalyst casing 6, namely correlating with the temperature of the SCR catalyst housed in the second catalyst casing 6. The crank position sensor 11 outputs an electrical signal correlating with the rotational position of the output shaft (crankshaft) of the internal combustion engine 1. The accelerator position sensor 12 outputs an electrical signal correlating with the operation amount of the accelerator pedal (accelerator opening degree). The air flow meter 13 outputs an electrical signal correlating with the quantity of air taken into the internal combustion engine 1 (intake air quantity). The A/F sensor 14 is provided in the exhaust passage 3 upstream of the first catalyst casing 5 and outputs an electrical signal correlating with the air-fuel ratio of the exhaust gas.

The ECU 10 is electrically connected with various devices such as the fuel injection valve 1a, the throttle valve 4, the reducing agent addition valve 7, the pump 70, and the EGR valve 101. The ECU 10 electrically controls the aforementioned devices based on output signals of the aforementioned various sensors. For example, the ECU 10 executes temperature raising processing for raising the temperature of the SCR catalyst housed in the second catalyst casing 6 when the temperature of the SCR catalyst is lower than a purification temperature window, as well as known control such as fuel injection control for the internal combustion engine 1 and addition control for causing the reducing agent addition valve 7 to inject reducing agent intermittently. In the following, how the temperature raising processing in this embodiment is performed will be described.

Figure 2:
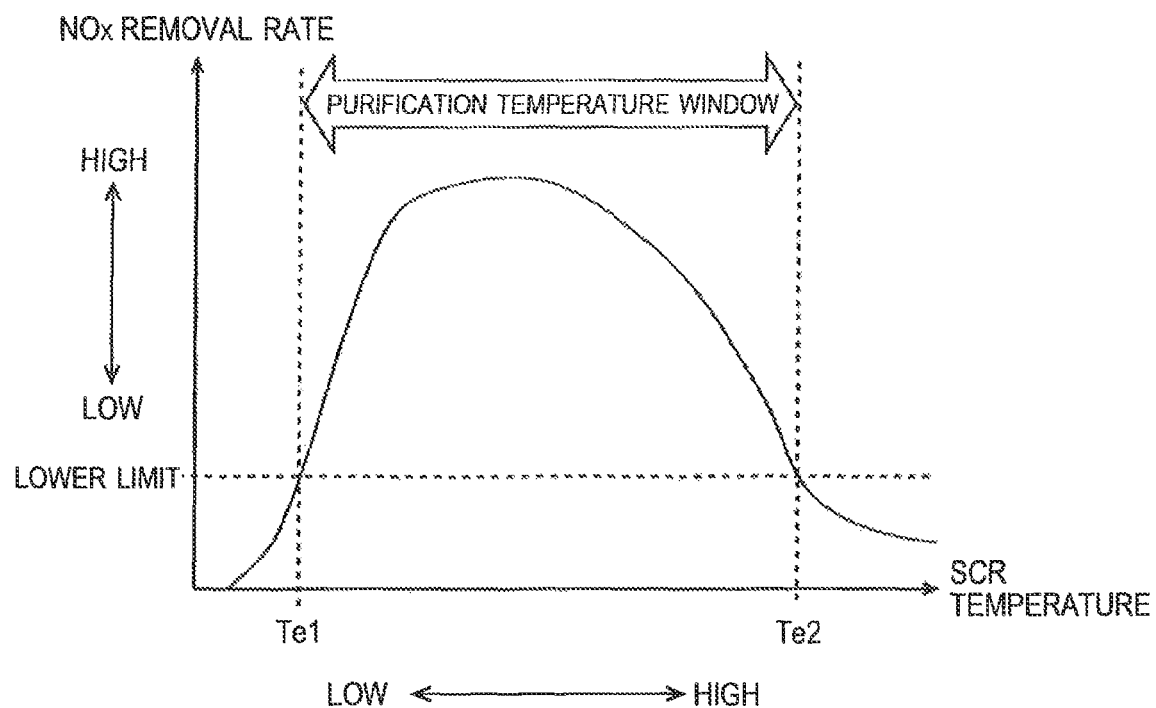
FIG. 2 is a graph showing relationship between the temperature of an SCR catalyst and its $NO_x$ removal rate.

A temperature range (purification temperature window) in which the $NO_x$ removal ability of the SCR catalyst is active will be described with reference to FIG. 2. In FIG. 2, the horizontal axis represents the temperature of the SCR catalyst, and the vertical axis represents the $NO_x$ removal rate of the SCR catalyst (that is, the ratio of the amount of $NO_x$ removed by the SCR catalyst to the amount of $NO_x$ flowing into the SCR catalyst). When the temperature of the SCR catalyst is lower than a first temperature Te1, the reducing ability of the SCR catalyst is so low that the $NO_x$ removal rate falls short of a predetermined lower limit value. On the other hand, when the temperature of the SCR catalyst is higher than a second temperature Te2, which is higher than the first temperature Te1, the amount of $NH_3$ that the SCR catalyst can adsorb is so small that the $NO_x$ removal rate falls short of the lower limit value. Therefore, the SCR catalyst have effective $NO_x$ removal ability in the temperature range (purification temperature window) from the first temperature Te1 to the second temperature Te2. The first temperature Te1 and the second temperature Te2 vary depending on the amount of the supported SCR catalyst and the volume of the SCR catalyst etc., and it is desirable that a purification temperature window adapted to the SCR catalyst used in a vehicle be determined in advance by an experiment.

When the temperature of the SCR catalyst is lower than the aforementioned first temperature Te1 (i.e. lower than the purification temperature window), it is necessary to raise the temperature of the SCR catalyst quickly. Possible methods to achieve this include restricting the intake air quantity to make it smaller or making the fuel injection quantity larger when the temperature of the SCR catalyst is lower than the purification temperature window (i.e. lower than the first temperature Te1) than when it falls within the purification temperature window (i.e. when it is not lower than the first temperature Te1 and not higher than the second temperature Te2). If one of these methods is employed, the flow rate of the exhaust gas decreases; and the quantity of heat contained in a unit quantity of exhaust gas increases (i.e. the exhaust gas temperature rises); leading to a decrease in the quantity of heat taken from the SCR catalyst by the exhaust gas and an increase in the quantity of heat transferred from the exhaust gas to the SCR catalyst. Consequently, the temperature of the SCR catalyst raises quickly.

If the fuel injection quantity is increased regardless of the intake air quantity, although the quantity of heat contained in a unit quantity of exhaust gas increases, there is a possibility that the amount of PM (e.g. smoke) contained in the exhaust gas may increase. A possible countermeasure to this is to restrict the fuel injection quantity in relation to the intake air quantity. The "fuel injection quantity" mentioned in this context refers to, for example, the pilot injection quantity or the main injection quantity, that is, the quantity of fuel that is injected at such timing that the injected fuel contributes to the output power (or the generated torque) of the internal combustion engine 1 and correlates with the amount of PM generated.

If the fuel injection quantity is restricted to be small, the amount of PM generated by fuel combustion in the cylinders can be reduced. However, the quantity of heat contained in a unit quantity of exhaust gas is smaller when the fuel injection quantity is restricted to be small than when the fuel injection quantity is not restricted. Moreover, when the fuel injection quantity is restricted to be small, there is a possibility that the torque generated by the internal combustion engine 1 may fall short of the torque required by the driver. In particular, when the internal combustion engine 1 is operated in an accelerating state, if the intake air quantity and/or the fuel injection quantity is restricted, there is a possibility that the accelerating performance of the vehicle expected by the driver may not be achieved, leading to deterioration in the drivability.

In view of the above circumstances, in the temperature raising processing in this embodiment, the ECU 10 is adapted to determine a restriction value of the fuel injection quantity (a value or quantity by which the fuel injection quantity is decreased) taking into account the intake air quantity and the temperature of the SCR catalyst. Specifically, the ECU 10 corrects the restriction value of the fuel injection quantity in such a way that the restriction value of the fuel injection quantity is made smaller (namely, the fuel injection quantity after restriction is made larger) when the intake air quantity is large and the temperature of the SCR catalyst is low than when the intake air quantity is small and/or the temperature of the SCR catalyst is high.

Figure 3:
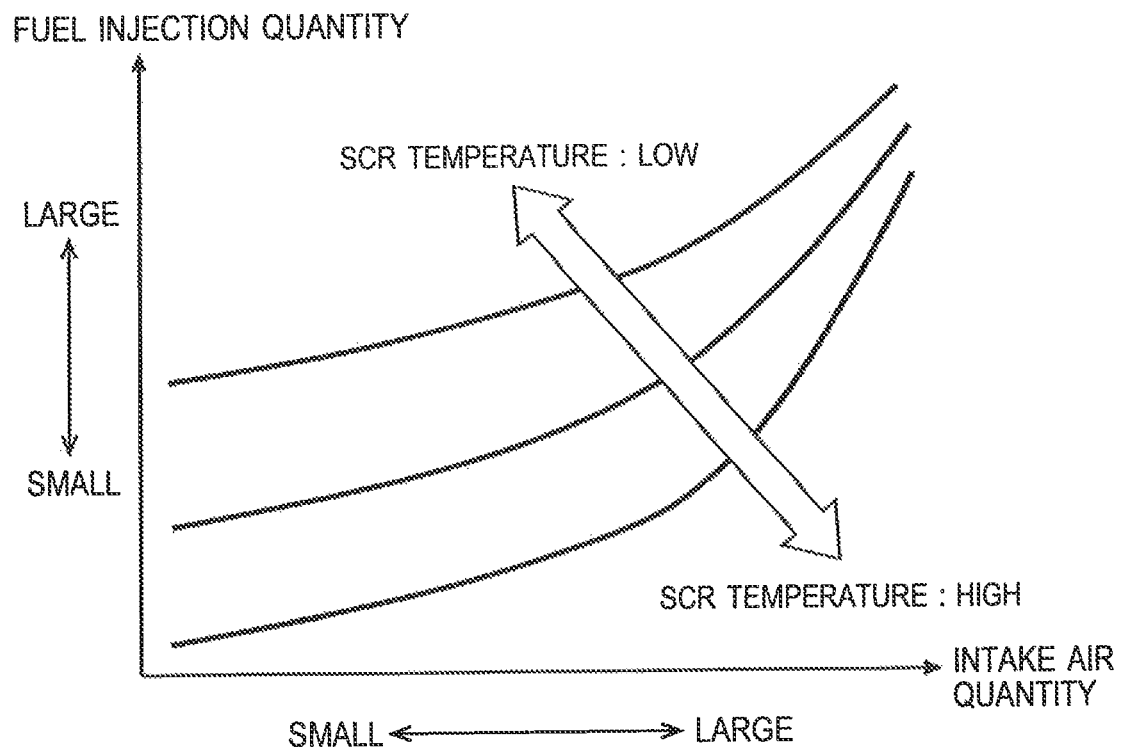
FIG. 3 is a graph showing relationship of the intake air quantity and the temperature of the SCR catalyst with the fuel injection quantity after restriction.

Relationship of the intake air quantity and the temperature of the SCR catalyst with the fuel injection quantity after restriction is shown in FIG. 3. In FIG. 3, the lower the temperature of the SCR catalyst is, the larger the fuel injection quantity after restriction is. Furthermore, the larger the intake air quantity is, the larger the fuel injection quantity after restriction is. In other words, the restriction value of the fuel injection quantity is decreased as the temperature of the SCR catalyst decreases, and the intake air quantity increases.

The fuel injection quantity after restriction may be increased continuously in reverse proportion to the temperature of the SCR catalyst. Alternatively, the fuel injection quantity after restriction may be increased stepwise with decreases in the temperature of the SCR catalyst. Moreover, the fuel injection quantity after restriction may be increased in proportion to the intake air quantity. Alternatively, the fuel injection quantity after restriction may be increased stepwise with increases in the intake air quantity.

In the case where the restriction value of the fuel injection quantity is corrected in the above-described manner, the quantity of heat contained in a unit quantity of exhaust gas becomes larger than in the case where the restriction value is not corrected, and therefore, the temperature of the SCR catalyst can be raised quickly. Moreover, in the case where the restriction value of the fuel injection quantity is corrected, the quantity of fuel contributing to the output power of the internal combustion engine 1 is larger than in the case where the restriction value is not corrected, and therefore, it is possible to make the difference between the torque generated by the internal combustion engine 1 and the torque required by the driver small when the internal combustion engine 1 is operated in an accelerating state.

In the case where the restriction value of the fuel injection quantity is corrected, the amount of PM generated by the combustion of fuel in the cylinders (i.e. the amount of PM emitted from the internal combustion engine 1) can be larger than that in the case where the restriction value is not corrected. However, since the restriction value of the fuel injection quantity is made smaller as the intake air quantity increases (namely, the fuel injection quantity is corrected in such a way that the larger the intake air quantity is, the larger the fuel injection quantity after restriction is), excessive increase in the amount of PM generated can be prevented from occurring. Furthermore, since the PM emitted from the internal combustion engine 1 is trapped by the particulate filter, the amount of PM emitted to the atmosphere does not increase greatly.

Figure 4:
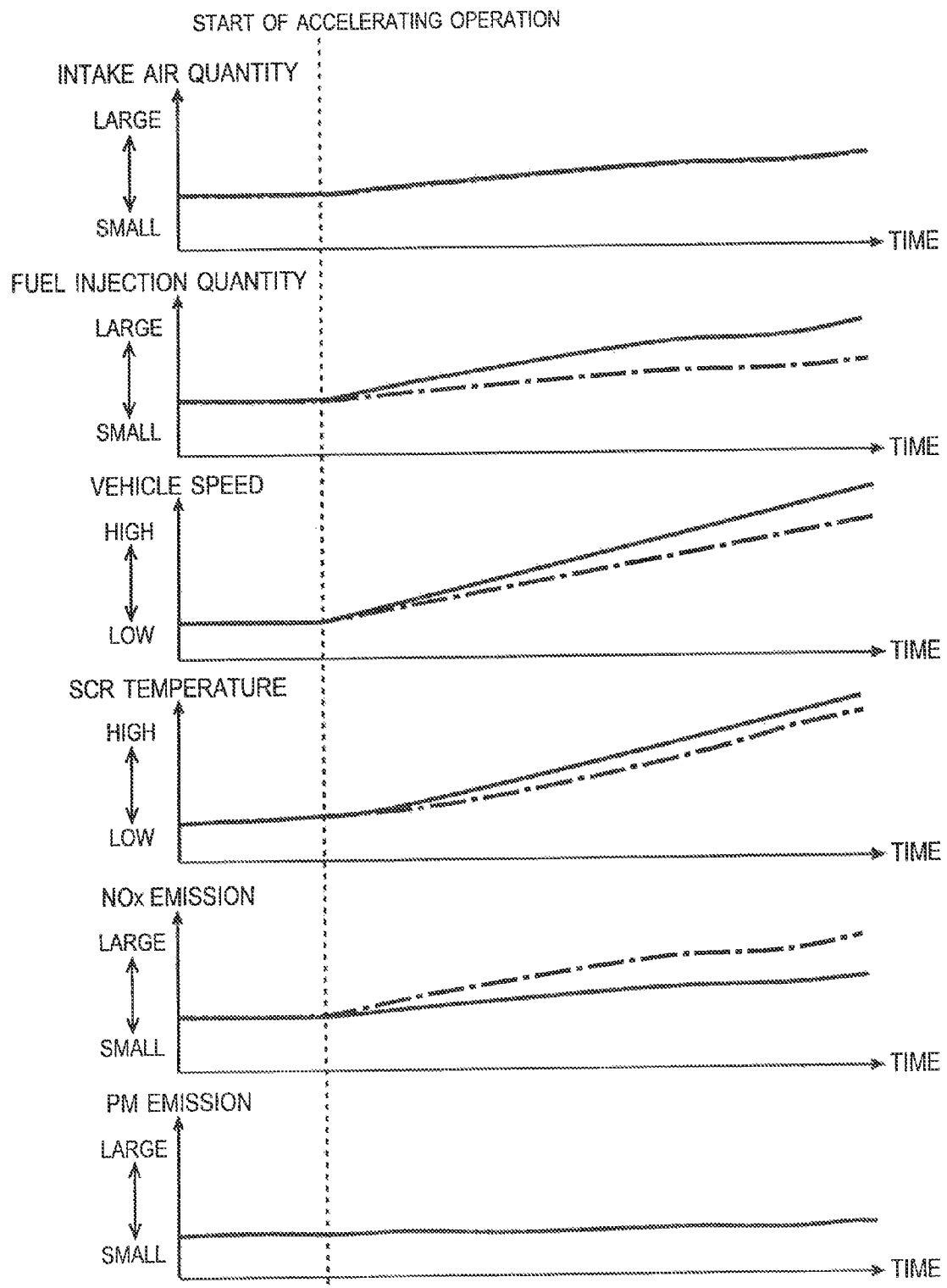
FIG. 4 shows the changes with time of the intake air quantity, the fuel injection quantity, the vehicle speed, the temperature of the SCR catalyst, the amount of $NO_x$ emissions, and the amount of PM emissions while the internal combustion engine 1 is in an accelerating operation state.

FIG. 4 shows the changes with time of the intake air quantity, the fuel injection quantity, the traveling speed of the vehicle (vehicle speed), the temperature of the SCR catalyst, the amount of $NO_x$ emitted to the atmosphere, and the amount of PM emitted to the atmosphere in the case where the restriction value of the fuel injection quantity is corrected and in the case where it is not corrected when the internal combustion engine 1 is operated in an accelerating state. In FIG. 4, the solid curves represent the changes with time of the values in the case where the restriction value is corrected, and the chain curves represent the changes with time of the values in the case where the restriction value is not corrected.

As shown in FIG. 4, in the case where the restriction value is corrected, the rate of increase in the travelling speed of the vehicle (vehicle speed) during the accelerating operation is larger than in the case where the restriction value is not corrected, because the quantity of fuel contributing to the output power of the internal combustion engine 1 is larger. Therefore, the difference between the torque generated by the internal combustion engine 1 and the torque required by the driver is made smaller, so that deterioration in the drivability can be prevented or reduced.

The intake air quantity in the case where the restriction value of the fuel injection quantity is corrected and that in the case where the restriction value is not corrected are substantially equal. Therefore, the quantity of heat contained in a unit quantity of exhaust gas is larger in the case where the restriction value of the fuel injection quantity is corrected than in the case where it is not corrected. Consequently, the temperature of the SCR catalyst becomes higher and the rate of temperature rise is higher in the case where the restriction value of the fuel injection quantity is corrected than in the case where it is not corrected. Therefore, the temperature of the SCR catalyst can be raised quickly.

As the temperature of the SCR catalyst and the rate of rise in the temperature of the SCR catalyst increase, the $NO_x$ removal rate of the SCR catalyst increases. Therefore, the amount of $NO_x$ emitted to the atmosphere or the amount of $NO_x$ that is not removed by the SCR catalyst (the $NO_x$ emission shown in FIG. 4) is smaller in the case where the restriction value of the fuel injection quantity is corrected than in the case where it is not corrected. On the other hand, although the amount of PM emitted from the internal combustion engine 1 becomes lager in the case where the restriction value of the fuel injection quantity is corrected than in the case where it is not corrected, the particulate filter traps the PM including the increase. Therefore, the amount of PM emitted to the atmosphere (the PM emission shown in FIG. 4) in the case where the restriction value of the fuel injection quantity is corrected is kept substantially equal to that in the case where the restriction value of the fuel injection quantity is not corrected.

If the restriction value of the fuel injection quantity is corrected when the amount of PM trapped in the particulate filter is large, there is a possibility that the amount of trapped PM may become excessively large due to an increase in the quantity of PM emitted from the internal combustion engine 1. An excessively large amount of PM trapped in the particulate filter leads to an increase in the pressure loss across the particulate filter, possibly leading to an excessively high back pressure acting on the internal combustion engine 1. An excessively high back pressure acting on the internal combustion engine 1 makes the output power of the internal combustion engine 1 lower, possibly leading to deterioration in the acceleration performance of the vehicle, contrary to the intended purpose.

In view of the above, in this embodiment, the restriction value of the fuel injection quantity is corrected on condition that the amount of PM trapped in the particulate filter is not larger than a predetermined amount. The predetermined amount mentioned above is determined to be equal to an amount of PM trapped in the particulate filter that is not considered to lead to excessively high back pressure acting on the internal combustion engine 1 even if the restriction value of the fuel injection quantity is corrected, or equal to that amount of trapped PM minus a margin. The predetermined amount is determined in advance by an adaptation process based on, for example, an experiment.

If the restriction value of the fuel injection quantity is corrected on condition that the amount of PM trapped in the particulate filter is not larger than the predetermined amount, the temperature of the SCR catalyst can be raised while preventing the back pressure acting on the internal combustion engine 1 from becoming excessively high.

Therefore, the temperature raising processing performed in the above-described manner can raise the temperature of the SCR catalyst while preventing or reducing deterioration in the drivability and increase in exhaust emissions.

Figure 5:
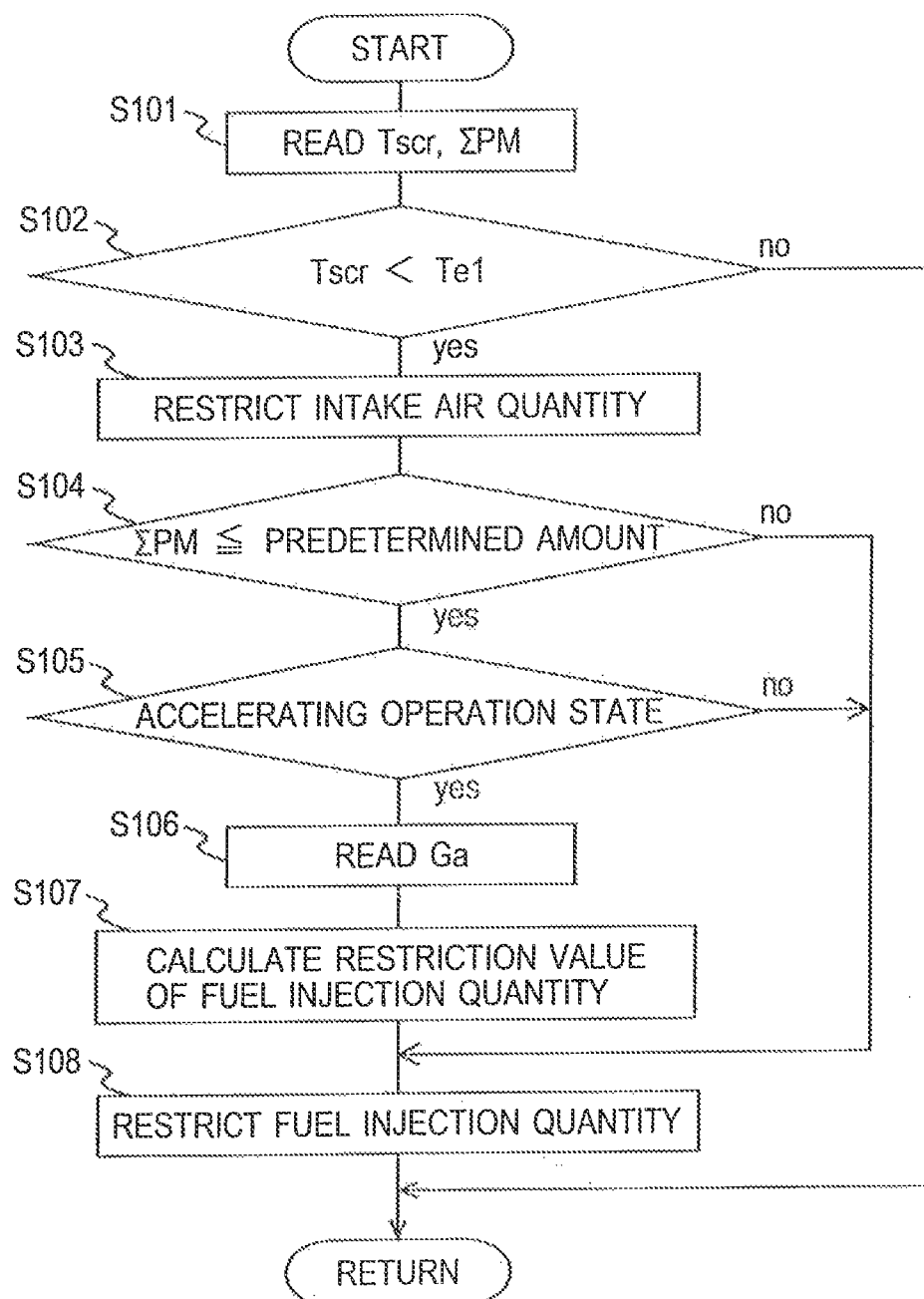
FIG. 5 is a flow chart of a processing routine executed by an ECU when temperature raising processing is performed in a first embodiment.

In the following, a procedure of executing the temperature raising processing in this embodiment will be described with reference to FIG. 5. FIG. 5 is a flow chart of a processing routine executed by the ECU when the temperature raising processing is performed. The processing routine shown in FIG. 5 is stored in the ROM of the ECU 10 in advance, and executed by the ECU 10 periodically.

In the processing routine shown in FIG. 5, the processing of step S101 is firstly executed. Specifically, in the processing of step S101, the ECU 10 reads the temperature of the SCR catalyst and the trapped PM amount $\Sigma PM$ in the particulate filter. In this step, the ECU 10 may read an output signal of the first exhaust temperature sensor 8 as the temperature of the SCR catalyst. Alternatively, the ECU 10 may read a value calculated (or estimated) using parameters concerning the operation history of the internal combustion engine 1 (such as the integrated intake air quantity and the integrated fuel injection quantity since the start of the internal combustion engine). The trapped PM amount $\Sigma PM$ may be calculated using as parameters an output signal of a differential pressure sensor not shown in the drawings and an output signal of the air flow meter 13 (i.e. the flow rate of the exhaust gas). Alternatively, it may be calculated (or estimated) from the operation history of the internal combustion engine 1 (such as the integrated value of the intake air quantity and the integrated value of the fuel injection quantity). The temperature obtaining means and the trapped PM amount obtaining means according to the present invention are embodied by the ECU 10 executing the processing of step S101.

In the processing of step S102, the ECU 10 determines whether or not the temperature Tscr read in the above processing of step S101 is lower than the lower boundary (the first temperature) Te1 of the purification temperature window. If the determination made in the processing of step S102 is negative (Tscr≥Te1), the ECU 10 terminates the execution of this routine without performing the temperature raising processing. On the other hand, if the determination made in the processing in step S102 is affirmative (Tscr<Te1), the ECU proceeds to the processing of step S103.

In the processing of step S103, the ECU 10 restricts the intake air quantity of the internal combustion engine to make it smaller. The method of restricting the intake air quantity to make it smaller may be making the degree of opening of the throttle valve 4 smaller, making the degree of opening of the exhaust throttle valve smaller, making the timing of intake valve opening (IVO) later (or retarding the IVO), or making the timing of intake valve closing (IVC) earlier (or advancing the IVC), than in the case where the temperature Tscr of the SCR catalyst falls within the purification temperature window (i.e. not lower than the first temperature Te1 and not higher than the second temperature Te2). The throttle valve 4 or other component is controlled in such a way that the lower the temperature Tscr of the SCR catalyst is, the smaller the intake air quantity becomes. This is because the lower the temperature Tscr of the SCR catalyst is, the larger the quantity of heat contained in a unit quantity of exhaust gas needs to be made, and the smaller the quantity of heat taken from the SCR catalyst by the exhaust gas needs to be made. The intake air quantity restriction means according to the present invention is embodied by the ECU 10 executing the processing of step S103.

In the processing of step S104, the ECU 10 determines whether or not the trapped PM amount $\Sigma PM$ read in the above step S101 is not larger than the predetermined amount. If the determination made in step S104 is affirmative ($\Sigma PM \leq$ predetermined amount), the ECU 10 proceeds to the processing of step S105.

In the processing of step S105, the ECU 10 determines whether or not the internal combustion engine 1 is in an accelerating operation state. Specifically, the ECU 10 may calculate the rate of increase in the accelerator opening degree from an output signal of the accelerator position sensor 12, and if the rate of increase in the accelerator opening degree is not lower than a predetermined value, the ECU 10 may determine that the internal combustion engine 1 is in an accelerating operation state. Alternatively, the ECU 10 may calculate the rate of increase in the engine speed from an output signal of the crank position sensor 11, and if the rate of increase in the engine speed is not lower than a predetermined value, the ECU 10 may determine that the internal combustion engine 1 is in an accelerating operation state.

In the processing of step S106, the ECU 10 reads intake air quantity Ga after restriction. Specifically, the ECU 10 reads an output signal of the air flow meter 13.

In the processing of step S107, the ECU 10 calculates a restriction value of the fuel injection quantity. Specifically, as described before with reference to FIG. 3, the ECU 10 calculates the restriction value in such a way that the fuel injection quantity after restriction is made larger when the temperature Tscr of the SCR catalyst is low and the intake air quantity Ga is large than when the temperature Tscr of the SCR catalyst is high and/or the intake air quantity Ga is small. In connection with this, relationship like that shown in FIG. 3 may be prepared in advance as a map, and the restriction value may be determined from the intake air quantity Ga and the temperature Tscr of the SCR catalyst using this map. The correction means according to the present invention is embodied by the ECU 10 executing the processing of step S107.

In the processing of step S108, the ECU 10 executes restriction of the fuel injection quantity using the restriction value calculated in the above step S107. For example, the ECU 10 subtract the restriction value calculated in the processing of the above step S107 from a target fuel injection quantity calculated by a separate fuel injection quantity calculation routine and controls the fuel injection valve 1*a* according to the fuel injection quantity after restriction. The fuel restriction means according to the present invention is embodied by the ECU 10 executing the processing of step S108.

If the determination made in step S104 or S105 is negative, the ECU 10 skips the processing of step S106 and S107 and executes the processing of step S108. In this case, the ECU 10 restricts the fuel injection quantity using a specific restriction value of the fuel injection quantity. The specific restriction value is determined using as a parameter the intake air quantity Ga of the internal combustion engine 1 in such a way as to make the amount of PM emitted from the internal combustion engine 1 small.

The temperature raising processing performed according to the above-described processing routine can raise the temperature of the SCR catalyst quickly while preventing an increase in exhaust emissions, deterioration in the acceleration performance, and excessively large increase in the trapped PM amount.

Therefore, according to this embodiment, in the internal combustion engine equipped with the exhaust gas purification apparatus provided in the exhaust passage and including the SCR catalyst and the particulate filter, when the temperature of the SCR catalyst is low, it is possible to make the SCR catalyst active promptly while preventing an increase in exhaust emissions and deterioration in the drivability.

While in the above description of the embodiment, an exemplary exhaust gas purification apparatus according to the present invention in which the SCR catalyst is arranged downstream of the particulate filter has been described, the particulate filter may be arranged downstream of the SCR catalyst, or the SCR catalyst may be supported on the particulate filter. The exhaust gas purification apparatus according to the present invention may employ an arrangement in which a storage reduction catalyst is provided downstream of a particulate filter, an arrangement in which a particulate filter is located downstream of a storage reduction catalyst, or an arrangement in which a storage reduction catalyst is supported on a particulate filter.

DESCRIPTION OF THE REFERENCE SIGNS

1: internal combustion engine
1a: fuel injection valve
2: intake passage
3: exhaust passage
4: throttle valve
5: first catalyst casing
6: second catalyst casing
7: reducing agent addition valve
8: first exhaust gas temperature sensor
9: second exhaust gas temperature sensor
10: ECU
11: crank position sensor
12: accelerator position sensor
13: air flow meter
14: A/F sensor
70: pump
71: reducing agent tank
100: EGR passage
101: EGR valve

The invention claimed is:

1. A control system for an internal combustion engine, comprising:
an exhaust gas purification apparatus arranged in an exhaust passage of the internal combustion engine and including an $NO_x$ catalyst having an ability of reducing $NO_x$ and a particulate filter; and
an electronic control unit configured to:
obtain the temperature of said $NO_x$ catalyst;
restrict the intake air quantity of the internal combustion engine in such a way as to make the air intake quantity smaller when the obtained temperature is less than a first predetermined temperature, as compared to when the obtained temperature is greater than the first predetermined temperature;
restrict a fuel injection quantity in relation to the intake air quantity of the internal combustion engine;
obtain a trapped PM amount, which is defined to be the amount of particulate matter trapped in said particulate filter; and
correct a restriction value of the fuel injection quantity, when the obtained trapped PM amount is not larger than a predetermined amount and the internal combustion engine is in an accelerating operation state, in such a way that the fuel injection quantity restriction is decreased when the obtained temperature is less than a second predetermined temperature and the intake air quantity is greater than a predetermined air-quantity amount as compared to when the obtained temperature is greater than the second predetermined temperature and/or the intake air quantity is less than the predetermined air-quantity amount.

* * * * *